United States Patent
Hellwig

(10) Patent No.: US 11,888,618 B2
(45) Date of Patent: Jan. 30, 2024

(54) MASTER, SLAVE, MASTER-SLAVE-COMMUNICATION SYSTEM, ON-CHIP INTERCONNECT SYSTEM, METHOD FOR OPERATING A MASTER, METHOD FOR OPERATING A SLAVE, METHOD FOR OPERATING A MASTER-SLAVE COMMUNICATION SYSTEM AND METHOD FOR OPERATING AN ON-CHIP INTERCONNECT SYSTEM

(71) Applicant: Infineon Technologies AG, Neubiberg (DE)

(72) Inventor: Frank Hellwig, Wunstorf (DE)

(73) Assignee: Infineon Technologies AG, Neubiberg (DE)

(*) Notice: Subject to any disclaimer, the term of this patent is extended or adjusted under 35 U.S.C. 154(b) by 0 days.

(21) Appl. No.: 17/694,768

(22) Filed: Mar. 15, 2022

(65) Prior Publication Data
US 2022/0303053 A1    Sep. 22, 2022

(30) Foreign Application Priority Data
Mar. 16, 2021  (DE) .................... 10 2021 106 379.5

(51) Int. Cl.
*H04L 1/00* (2006.01)
*H04L 12/40* (2006.01)

(52) U.S. Cl.
CPC .......... *H04L 1/0072* (2013.01); *H04L 1/0041* (2013.01); *H04L 1/0045* (2013.01); *H04L 12/40019* (2013.01)

(58) Field of Classification Search
CPC ... H04L 1/0041; H04L 1/0045; H04L 1/0072; H04L 12/40019; G06F 11/073; G06F 11/10; G06F 11/1645
See application file for complete search history.

(56) References Cited

U.S. PATENT DOCUMENTS

| 5,915,082 | A | * | 6/1999 | Marshall | ................. | G06F 11/10 714/E11.061 |
| 8,868,807 | B2 | | 10/2014 | Kashima | | |
| 10,567,117 | B2 | | 2/2020 | Shintomi | | |
| 2006/0179192 | A1 | | 8/2006 | Ganasan et al. | | |
| 2010/0287443 | A1 | * | 11/2010 | Rohleder | ............ | G06F 11/1645 710/110 |
| 2016/0048423 | A1 | * | 2/2016 | Williams | ............ | G06F 11/1004 714/819 |
| 2020/0272589 | A1 | * | 8/2020 | Rennig | ............... | G06F 11/0772 |

FOREIGN PATENT DOCUMENTS

| DE | 102019208058 | A1 | 12/2020 |
| JP | 2007265108 | A | 10/2007 |
| JP | 2010286977 | A | 12/2010 |
| JP | 2012038325 | A | 2/2012 |
| JP | 2019004205 | A | 1/2019 |

* cited by examiner

*Primary Examiner* — Shelly A Chase
(74) *Attorney, Agent, or Firm* — Eschweiler & Potashnik, LLC

(57) ABSTRACT

A master is provided which is connected to at least one slave via an interface, wherein the at least one master is designed, in a transmission mode to transfer a valid combination of output data and associated error detection data via the interface, and wherein the at least one master is furthermore designed, in a non-transmission mode, to output an invalid combination of output data and associated error detection data in case of an erroneous output request.

21 Claims, 6 Drawing Sheets

MASTER, SLAVE, MASTER-SLAVE-COMMUNICATION SYSTEM, ON-CHIP INTERCONNECT SYSTEM, METHOD FOR OPERATING A MASTER, METHOD FOR OPERATING A SLAVE, METHOD FOR OPERATING A MASTER-SLAVE COMMUNICATION SYSTEM AND METHOD FOR OPERATING AN ON-CHIP INTERCONNECT SYSTEM

REFERENCE TO RELATED APPLICATIONS

This application claims priority to German Application 10 2021 106 379.5, filed on Mar. 16, 2021. The contents of the above-referenced Patent Application are hereby incorporated by reference in their entirety.

FIELD

The invention relates to a master, a slave, a master-slave communication system, an on-chip interconnect system, a method for operating a master, a method for operating a slave, a method for operating a master-slave communication system and a method for operating an on-chip interconnect system.

BACKGROUND

In the case of a conventional multi-core unit (MCU) of a so-called on-chip system (see FIG. 1 for an exemplary system), in which a multiplicity of functions are provided on a single chip, provision is made of the functions of active functional devices, such as, for example, CPUs, direct memory access or high-speed communication, and passive functional devices, such as, for example, a memory, communication functions and other system functions which are configured and controlled by the active functions and are used by the active functions.

For the on-chip communication between these functional devices, on-chip interconnects are used, i.e. connection structures formed on the chip with corresponding communication protocols.

SUMMARY

In this case, the active functional devices are provided by masters connected to the interconnect, and the passive functional devices are provided by slaves.

The interconnect enables the masters to access the slaves. The interconnect is based on a communication protocol, for example AXI, AHB, SRI, FPI or the like, an address assignment describing, for each slave connected to the interconnect, the address at which the masters can access slaves and their resources (e.g. registers, memories, external resources). Moreover, it is necessary to define what type of access and with what access authorization the respective addresses can be read from and written to, and a bus network which controls the communication between the connected masters and slaves and realizes the connections for example by means of lines in the interconnect 110 and multiplexers 108 (for arbitration, address and data paths, debug support, etc.)

Interconnects can be formed for example as single-master interconnects, as multi-master interconnects or as crossbar-based interconnects.

In the case of a multi-master interconnect, all masters and slaves connected thereto can share essential parts of the bus network with one another, for example can receive the same address phase signals and/or read and write data phase signals. That means that only an address phase, only a read data phase and/or only a write data phase can be present at any point in time.

In the case of a crossbar-based interconnect, a plurality of masters can simultaneously access a plurality of slaves. However, parallel access requests to the same slave are likewise processed one after another.

Furthermore, there are also intermediate forms, for example if a plurality of multi-master interconnects are formed as a so-called multilayer interconnect, in which masters can have parallel access to different groups of slaves. In some cases, a system interconnect can be constructed from a plurality of interconnects with partly differing protocols, which interconnects can be connected via bridges to form a transparent system interconnect.

A master-slave access typically proceeds in three phases (for elucidation see also FIG. 4, which illustrates by way of example time profiles in the case of a master-slave access according to an FPI protocol): a request phase, an address phase, and one or more data phases. During the request phase, the master requests an interconnect access (in the case of a multi-master interconnect) or an access to a slave (in the case of a crossbar interconnect). The interconnect arbiter arbitrates (i.e. decides on an access order) if there are a plurality of access requests to the same resource. During the address phase, the master has obtained the permission of the interconnect arbiter and communicates (optionally in parallel) a plurality of information packets regarding the transaction to be carried out. For example, the information packets can communicate what type of transaction (e.g. whether it involves reading and/or writing, and an OP code), the address, a transaction ID for debugging, tracking and for access control, and control signals for indicating the start and end of the address phase. Regarding the one or more data phase(s), the data phase typically has a plurality of individual information items which can be transferred in parallel, for example read/write data, the transaction ID, an authorization code from the active slave to the active master in order to indicate errors, an exception or a valid data transfer, additional control signals for slowing down or terminating the data transfer, etc.

Dependent on the type of protocol used, the request phase and the address phase can be combined, for example in the case of a crossbar protocol.

In applications in which operational reliability is desired, it may be beneficial to detect any error which might result in an impairment of the data transfer in the case of a transfer from an active master (i.e. a master that is currently carrying out a data exchange with an active slave by means of the interconnect) to the active slave by means of the bus network.

In order to facilitate this, duplication of the bus network (wholly or partly) and lockstep operation would theoretically be conceivable, but is unacceptable in the normal case owing to the associated higher space requirements and increased energy consumption.

Therefore, nowadays preference is given to having recourse to protect the entire information transferred during the address and data phase by means of an error detection code.

In this case, a sender of the information can generate an error detection code (EDC) and transfer it through the bus network in parallel with the information or offset temporarily with respect to the information.

The receiver can then compare the received information with the received EDC and thus detect errors.

Individual control signals, such as request or permission signals, for example, can be supplemented by an EDC, for example a parity bit, a doubling, or the like.

However there is one aspect which currently is not sufficiently protected without a lockstep, and that is unintended or incorrect transactions based on a mixture of individual transaction information items (e.g. data phase data and data phase control information items) which are each individually EDC-protected (e.g. by means of data, handshake signals and slave acceptance code), but cannot be uniquely assigned to a transaction owing to protocol limitations. Read data, a read data transaction ID and read data handshake signals which are EDC-protected separately are an example of this.

In an exemplary case which a multiplexer structure 108 is switched incorrectly at times in a bus network, it can happen that incorrect information is communicated to a master and/or a slave. Even if a redundant bus network with lockstep support is present, the information would initially be incorrectly delivered and processed before the error would be detected by the lockstep logic with a delay of two cycles. Such a situation would be incompatible with objectives regarding reliability which provide for preventing errors from being forwarded within a system.

A comparable type of malfunction can also occur if the non-EDC-protected logic has an error. If for example master and/or slave use(s) output enable signals in order to signal to the bus network when said master and/or slave want(s) to transmit address phase, data phase or data phase control signals, or for example if a non-lockstep-protected master transmits an unwanted, but correct request.

FIG. 2 shows a schematic illustration of a master-slave system 100 having two masters 102 (active 102A and inactive 102nA) and two slaves 104 (active 104A and inactive 104nA), which are connected by means of an interconnect 110 (e.g. of a bus network), which can form an FPI bus (Flexible Peripheral Interconnect Bus), for example.

All the masters 102 and all the slaves have valid transaction information (i.e. including correct EDC data) in their output registers, which is advantageous for keeping a switchover rate and thus an energy consumption low.

(1) marks an exemplary situation in which, after an arbitration, address phase information is incorrectly forwarded from an output register of an inactive master 102nA. That is possibly not detected by the active slave 104A, depending on the type of transaction and bus network implementation.

(2) marks an exemplary situation in which control information is incorrectly forwarded from an output register of an inactive master 102nA. That can have the effect that incorrect write data are accepted by the active master 102A without being noticed.

(3) marks an exemplary situation in which control or data information is incorrectly forwarded from an output register of an inactive slave 104nA to the active master 102A. That can have the effect that, in the case of data that have been read, they are not detected as having been read erroneously, for example because an incorrect "data read valid" signal or data read incorrectly from the output register of the slave is/are not detected as such, for example because there is still a correct transaction ID from an earlier access in the output registers.

In various exemplary embodiments, provision is made of a master-slave communication system (for short: master-slave system) and respectively an on-chip interconnect system (also referred to as System-on-Chip) having a master-slave system with improved detection of error states or malfunctions, without additional chip area being required therefor.

In various exemplary embodiments, provision is made of a master-slave system and respectively a System-on-Chip with optimized EDC default values for improved cost-effective error detection.

In various exemplary embodiments, the master-slave system and respectively the System-on-Chip can be able to detect the malfunctions described above and thus to increase the operational reliability.

Exemplary embodiments of the invention are illustrated in the figures and are explained in greater detail below.

DETAILED DESCRIPTION

In the following detailed description, reference is made to the accompanying drawings, which form part of this application and show for illustration purposes specific embodiments in which the invention can be implemented. In this regard, direction terminology such as, for instance, "at the top", "at the bottom", "at the front", "at the back", "front", "rear", etc. is used with respect to the orientation of the figure(s) described. Since components of embodiments can be positioned in a number of different orientations, the direction terminology serves for illustration and is not restrictive in any way whatsoever. It goes without saying that other embodiments can be used and structural or logical changes can be made, without departing from the scope of protection of the present invention. It goes without saying that the features of the various exemplary embodiments described herein can be combined with one another, unless specifically indicated otherwise. Therefore, the following detailed description should not be interpreted in a restrictive sense, and the scope of protection of the present invention is defined by the appended claims.

In the context of this description, the terms "connected", "linked" and "coupled" are used to describe both a direct and an indirect connection, a direct or indirect linking and a direct or indirect coupling. In the figures, identical or similar elements are provided with identical reference signs, insofar as this is expedient.

The terms interconnect and interface are used interchangeably herein, in relation to a data exchange connection between master and slave.

Reference is made herein to error detection codes (EDCs). Alternatively or additionally, instead of an error detection code, an error correction code (ECC) can be used, which in addition to error detection usually also enables a certain measure of error correction.

Figure 1:
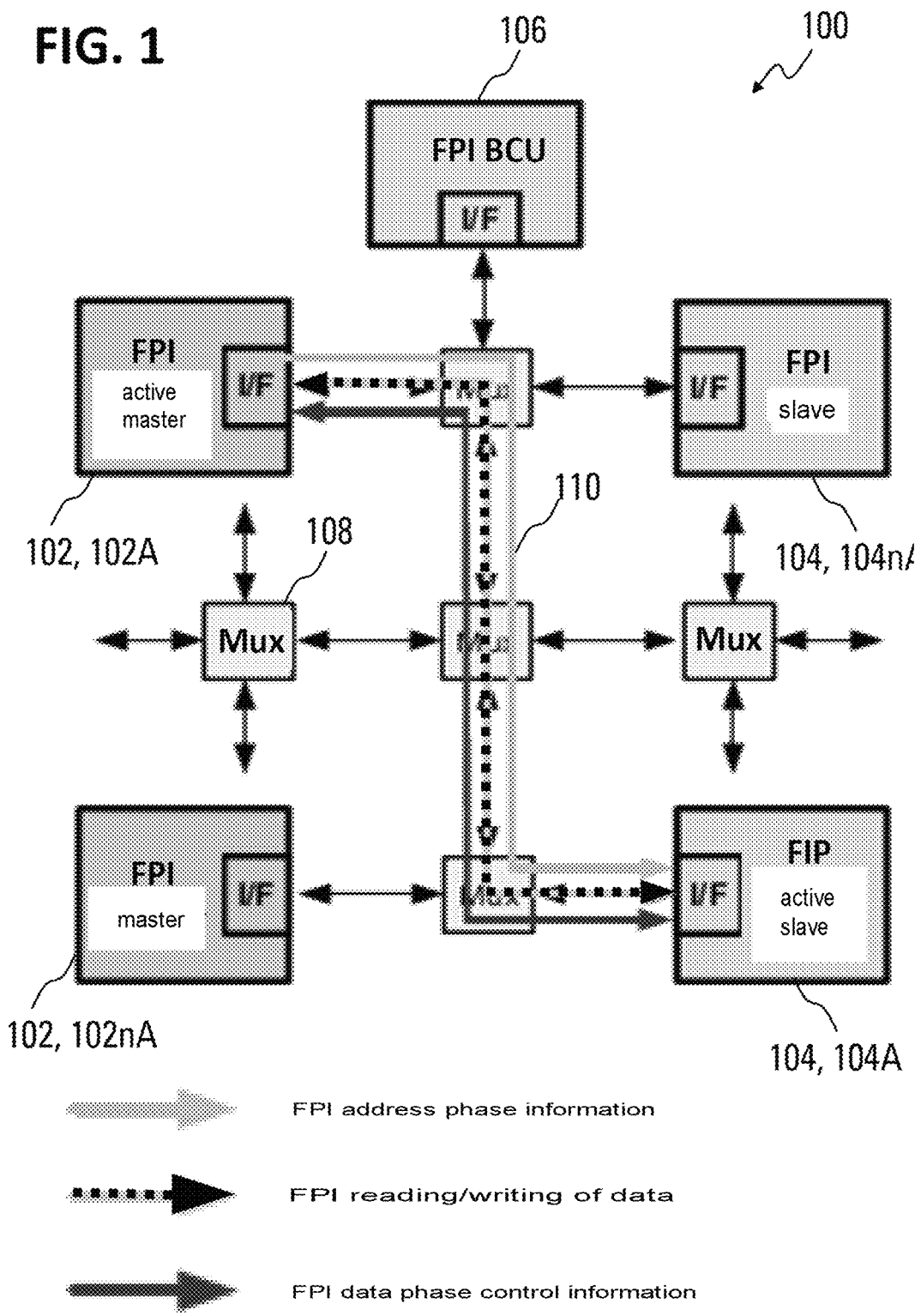
FIG. 1 shows a schematic illustration of a master-slave system in accordance with a prior art.
Figure 2:
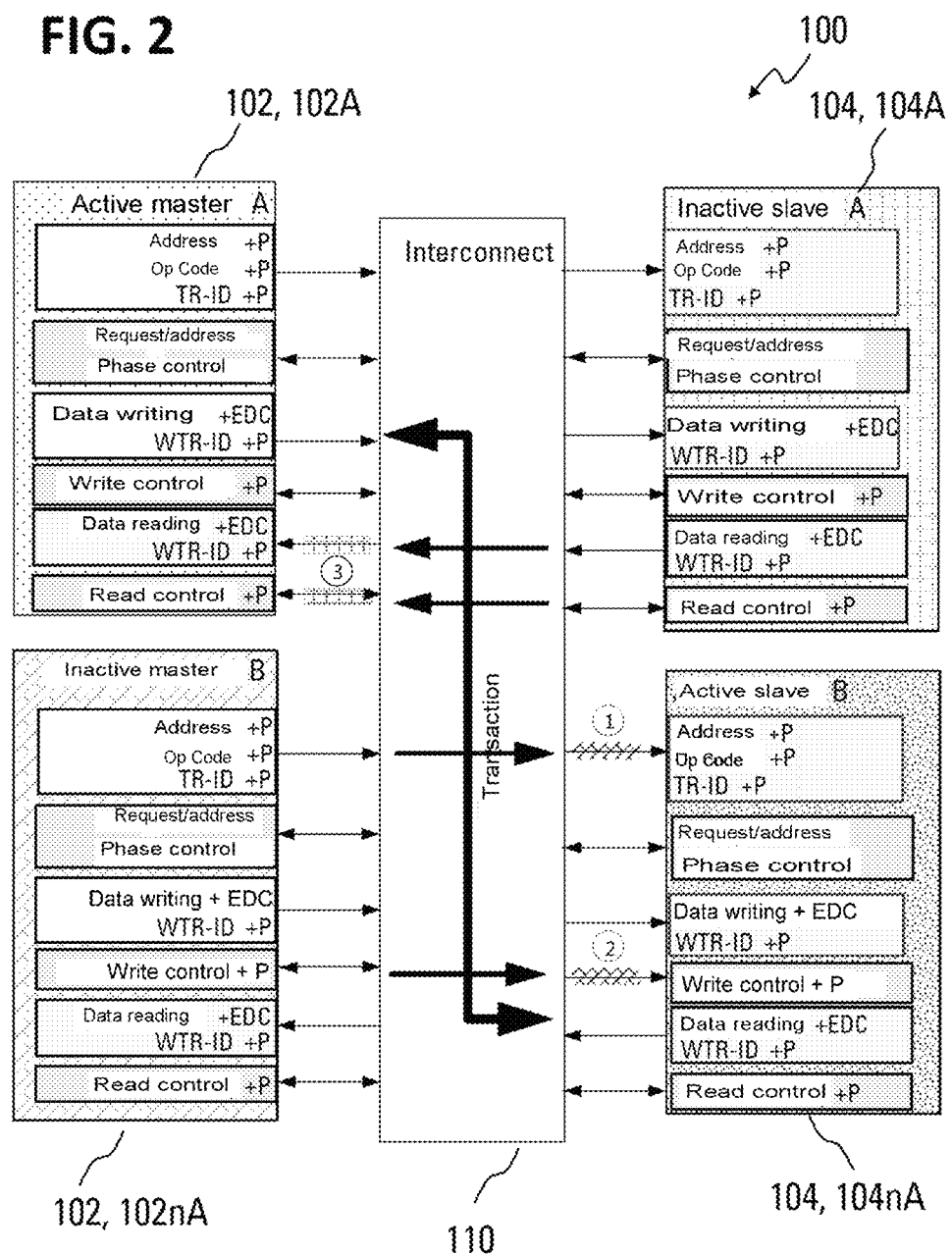
FIG. 2 shows a schematic illustration of a master-slave system in accordance with a prior art.

As described above, each master 102 and each slave 104 has output data memories (e.g. output registers) for storing transaction information which is transferred when the master 102 becomes the active master 102A, or the slave 104 becomes the active slave 104A. The output data memories are illustrated in FIG. 2 as small rectangular boxes which are labeled (in accordance with their function) and which are connected to an arrow pointing at least also in the direction of the interconnect 110.

As long as the master 102 or slave is inactive, the output data memories are filled with those values which were entered for the last transaction, or else with default values, and the correct assigned EDC values are likewise stored, either in the same output data memory or for example in stand-alone EDC output data memories.

Figure 4:
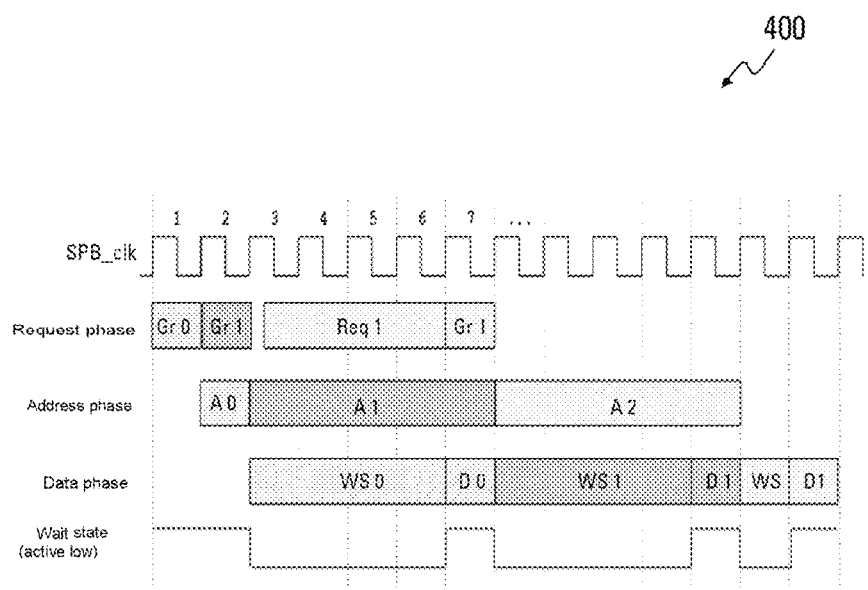
FIG. 4 shows a schematic illustration of data transfer processes in accordance with an FPI protocol.

As was explained above in association with FIG. 4, it can happen that transaction information between the active master 102A and the active slave 104A is replaced or fused with (according to EDC correct) information from output data memories of inactive masters 102nA and/or slaves 104nA.

Connection errors and/or data input errors may possibly remain undiscovered, as described above, because the EDC check reveals that the data are correct. By way of example, an erroneously transferred read readiness can have the effect that old data are read in at an unforeseen point in time, but are not detected as incorrect because the old data together with associated correct EDC were still in the output data memory and the EDC check thus validates the data.

In order to prevent the above-described undiscovered malfunctions or error states and the like in a simple manner, in various exemplary embodiments, a configuration of a master or of a slave is changed to the effect that in its respective output data memories it has stored an invalid data-EDC combination whenever it is not the active master or the active slave.

What can thus be achieved, in various exemplary embodiments, is that even if data from an output data memory are transferred inadvertently (for example in the case of an erroneous output request, e.g. as a reaction to such a request), the data are detected as invalid at the receiver.

In various exemplary embodiments, a protocol supplementation is provided in which a master has stored an invalid data-EDC combination (i.e. the data, the EDC data or both are changed such that the EDC check reveals that the data are invalid) whenever it is not the active master, e.g. the active master is provided for an address or data phase or not for transmission.

In various exemplary embodiments, a protocol supplementation is provided in which a slave has stored an invalid data-EDC combination (i.e. the data, the EDC data or both are changed such that the EDC check reveals that the data are invalid) whenever it is not the active slave, e.g. the active slave is provided for a data phase or not for transmission.

In various exemplary embodiments, what can thus be achieved is that a malfunction in the bus network which has the effect that transaction information from an active master or slave is replaced by output data memory values of an inactive master or slave is immediately discovered.

Errors of this type (which can originate within or outside a master and/or slave, within or outside a master-slave system), which have the effect that unintended or erroneous transactions are carried out, are detected without the need to know details regarding a set-up of the bus network and the implementation. A redundant embodiment of interconnect addresses and data paths with a corresponding lockstep implementation is accordingly superfluous.

Monitoring of the inactive masters and/or slaves can also be dispensed with.

Even in the case of multi-master interconnects, errors of this type are detected, in accordance with various exemplary embodiments, without knowledge of the logical combinations of the output signals in the bus network (e.g. controlled by "output enable", with AND combination).

An additional coverage for multi-master interconnects can furthermore be achieved in exemplary embodiments where only one master and one slave are active for each phase, and also in the case of crossbar interconnects, particularly in association with unique transaction identifications (transaction IDs).

In various exemplary embodiments, the additional error detection is realized without additional costs (in particular with regard to space requirement and energy consumption) and is easy to verify.

A reliability of the master-slave system and respectively of the System-on-Chip can be increased by virtue of the fact that the receiver of the transaction information immediately detects the errors and can immediately prevent the error from being passed on in the system.

Figure 3:
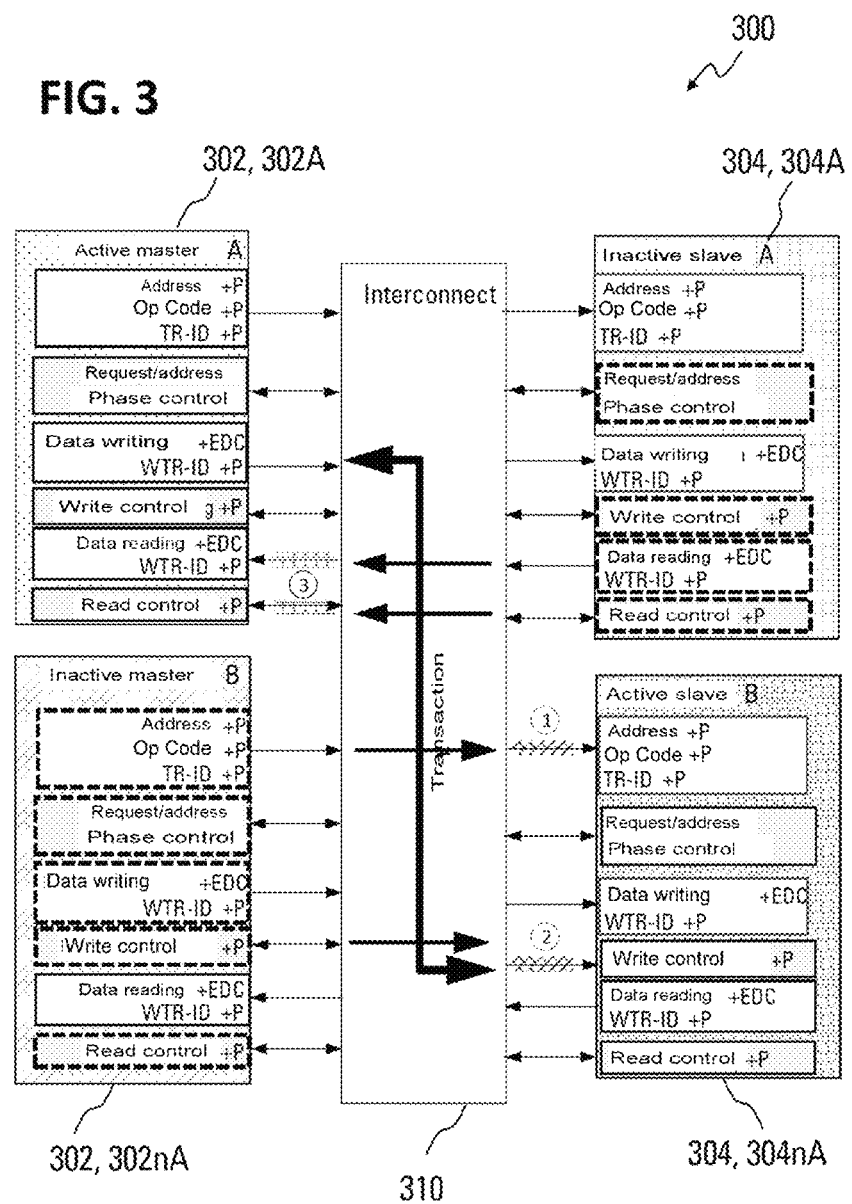
FIG. 3 shows a schematic illustration of a master-slave system in accordance with various exemplary embodiments.

FIG. 3 shows a schematic illustration of a master-slave system 300 in accordance with various exemplary embodiments.

The master-slave system 300 can comprise at least one master 302, for example a CPU, a direct memory access, a high-speed communication or the like. For better differentiation, active masters are identified by 302A and inactive masters by 302nA.

The master-slave system 300 can furthermore comprise at least one slave 304, for example a memory, a communication function or the like. For better differentiation, active slaves are identified by 304A and inactive slaves by 304nA.

The at least one master 302 can comprise at least one master output data memory. In FIG. 3 the master output data memories are illustrated in the active master 302A and in the inactive master 302nA as small rectangular boxes which are labeled (in accordance with their function) and which are connected to an arrow pointing at least also in the direction of the interconnect 310. The small boxes connected to an arrow pointing to the master 302 are master input registers. Small boxes with a double-headed arrow have both master input and master output data memories. Master output data memories are coupled to an EDC encoder, master input registers are coupled to an EDC decoder, and master input/output data memories are coupled to EDC encoder and EDC decoder.

The master-slave system 300 can furthermore comprise an interface 310 connecting the at least one master 302 to the at least one slave 304. The interface 310 can be designed to provide a data transfer between the at least one master 302 and the at least one slave 304 in both directions in accordance with a data transfer protocol, for example in accordance with AXI, AHB, SRI, FPI or the like.

The at least one master 302, the at least one slave 304 and the interface 310 can be embodied on a common chip and thus form a System-on-Chip, also referred to as an on-chip system.

In various exemplary embodiments, the at least one master 302A can be designed, in a transmission mode (it is then ready for transmission as active master 302A), to store in the master output data memory a valid combination of output data and associated error detection data for transfer by means of the interface 310. The output data and the associated error detection data can be stored in the same master output data memory, or can be stored in separate master output data memories.

The error detection data can be formed from the output data in an essentially known manner, for example as parity check, as repetition code, as Reed-Solomon code, as Hamming code or the like.

The at least one master 302 can furthermore be designed, in a non-transmission mode (then it is an inactive master 302nA or not ready for transmission as active master 302), to store an invalid combination of output data and associated error detection data in at least one master output data memory.

In various exemplary embodiments, the at least one slave 304 can comprise at least one slave output data memory. In FIG. 3, the slave output data memories are illustrated in the active slave 304A and in the inactive master 304nA as small rectangular boxes which are labeled (in accordance with their function) and which are connected to an arrow pointing at least also in the direction of the interconnect 310. The small boxes connected to an arrow pointing to the slave 304 are slave input registers. Small boxes with a double-headed arrow have both slave input and slave output data memories. Slave output data memories are coupled to an EDC encoder, slave input registers are coupled to an EDC decoder, and slave input/output data memories are coupled to EDC encoder and EDC decoder.

The at least one slave 304 can be designed, in a transmission mode (it is then ready for transmission as active slave 304A), to store in the slave output data memory a valid combination of output data and associated error detection data for transfer by means of the interface 310. The output data and the associated error detection data can be stored in the same slave output data memory, or can be stored in separate slave output data memories.

The error detection data can be formed from the output data in an essentially known manner, for example as parity check, as repetition code, as Reed-Solomon code, as Hamming code or the like.

The at least one slave 304 can furthermore be designed, in a non-transmission mode (then it is an inactive slave 304nA or not ready for transmission as active slave 304A), to store an invalid combination of output data and associated error detection data in at least one slave output data memory.

In various exemplary embodiments, the master-slave system 300 comprises both the at least one master 302 and the at least one slave 304 described.

In various exemplary embodiments, for example if a data communication from the master output data memory or from the slave output data memory has already been effected previously, the invalid combination of output data and associated error detection data can be formed from the previously stored valid combination of output data and associated error detection data by means of changing, for example inverting, at least one bit of the error detection data and/or at least one bit of the output data.

In this case, the at least one bit can be changed so as to facilitate that the erroneous nature of the data is able to be ascertained during a check of the validity of the data by means of the EDC.

Changing, for example inverting, a single bit either in the case of the data or in the case of EDC data can constitute a very simple and not very energy-intensive possibility for invalidating the data-EDC combination.

A possibility associated with higher energy expenditure can constitute inverting all bits of the error detection data and maintaining all bits of the output data, or, conversely, inverting all bits of the output data and maintaining all bits of the error detection data, which however possibly leads with higher certainty to invalidation of the data-EDC combination.

In various exemplary embodiments, a plurality of predetermined bits of the output data and/or a plurality of predetermined bits of the EDC data can be changed, e.g. inverted.

In various exemplary embodiments, the at least one slave 304 (e.g. a plurality of slaves) can furthermore be designed, in a reception mode, to receive data and associated error detection data by means of the interface 310 and to verify the data by means of the associated error detection data, wherein data received in the slave 304 owing to an error (e.g. from the at least one master 302 in the non-transmission mode) are detected as invalid.

The slave 304 can be designed, in the case where reception of invalid data is ascertained, to carry out a predetermined action, for example to ignore the received data, to transmit a warning, or the like.

The at least one master 302 (e.g. a plurality of masters 302) can furthermore be designed, in a reception mode, to receive data and associated error detection data by means of the interface 310 and to verify the data by means of the associated error detection data, wherein data received in the master 302 owing to an error (e.g. from the at least one slave 304 in the non-transmission mode) are detected as invalid.

The master 302 can be designed, in the case where reception of invalid data is ascertained, to carry out a predetermined action, for example to ignore the received data, to transmit a warning, or the like.

In various exemplary embodiments, the master 302 or the slave 304 can be configured to store the invalid data/EDC combination in its output data memories as long as EDC data relating to control signal data, address data and data in the data phase are irrelevant regarding the interconnect protocol used.

Depending on the communication protocol used, there may be signals which are permanently evaluated by the bus network, for example a master request (request for interface 310/interconnect access) to an arbiter or similar signals. Corresponding output data memories are accordingly permanently filled with valid data.

Names of the corresponding control signals for the master 302 can vary. In the case of multi-master interconnect protocols, a specific request and permission signal between master 302 and arbiter is often defined, which means that the request signals are permanently filled with a valid data-EDC combination.

In the case of crossbar-based interconnect protocols, the request and address phases often coincide, such that the master 302 for example transmits an access request by means of an "address valid" signal, and obtains a confirmation by means of an "address ready" signal. That can mean that the master 302 and the slave permanently provide the "address valid" and "address ready" with a valid EDC.

The respective interconnect specification defines details regarding phases in which control signals, address signals and/or data signals from masters 302 slaves 304 and arbiters are in the "disregard" mode.

Since, in accordance with various exemplary embodiments, the data-EDC combinations are intended to be invalidated whenever they are not intended to be evaluated regularly (e.g. by means of the bus network or connected masters 302 or slaves 304), that also applies to the phases described.

The masters 302, slaves 304 and arbiters can of course vary in terms of their properties, for example whether, in the event of each timing clock cycle in which they do not provide output information to be evaluated, they provide an invalid data-EDC combination in their output data memories, which would be the preferred variant, particularly in cases where it is not possible to foresee when a connection error might occur.

Alternatively, the masters 302, slaves 304 and arbiters could provide the invalid only at specific times or only for a portion of the data/EDC output data memories.

It is thus possible for example to simplify an implementation or to take account of a circumstance that errors are not expected to a significant extent in specific bus protocol situations.

In various exemplary embodiments, the invalidation (rendering invalid) of the data-EDC combination can be effected in a manner in which the data are invalidated, specifically not only with regard to their assigned EDC but additionally with regard to expected values.

By way of example, invalid addresses, invalid transaction IDs and/or, depending on the interconnect protocol, invalid OP codes (which usually indicate the type of transaction during the address phase) and/or invalid control signal combinations can be entered in the master output data memories or the slave output data memories while they are irrelevant for the interconnect protocol used.

The invalidation of the EDC is typically preferred because it is associated with a minimal additional switchover rate (e.g. switching over only one EDC bit can be sufficient), and problems with regard to a limitation in the case of payload data or addresses or regarding protocol updates if a previously reserved code is used for realizing new features can be avoided.

A master 302 transitions to a transmission phase, such that the data in its output data memories becomes relevant, these are filled with valid data-EDC combinations.

Depending on which data were changed for the invalidation, this change can be changed back.

FIG. 3 illustrates—in a manner similar to FIG. 2—how the master-slave system 300 in accordance with various exemplary embodiments, deals with errors explained in association with FIG. 2.

In FIG. 3, all those output data memories which are filled with invalid data-EDC combinations are highlighted by means of a dashed frame. That concerns the output data memories of the inactive master 302nA and the output data memories of the inactive slave 304nA.

By virtue of the fact that all masters 302 and slaves 304 have stored invalid data-EDC combinations in their output data memories if they are not intended to communicate data in accordance with the protocol chosen, the error situations described are discovered, wherein an increase in the bit switchover rate may be negligible. By way of example, switching over only the least significant bit (LSB) of the EDC data may be sufficient.

For the error situation described under (1), which is also marked in FIG. 3, that means that after arbitration erroneous address phase information is detected as erroneous by every master other than the active master 302A.

In the case of error situation described under (2), each control signal which is transmitted incorrectly by an inactive master 302nA is detected as erroneous by the active slave 304A that receives the control signal.

In the case of the error situation described under (3), each control signal that is transmitted incorrectly by an inactive slave 304nA is detected as erroneous, and erroneous data transferred from an output data memory of an inactive slave 304nA are identified as erroneous in the active master 302A that receives the data.

In various exemplary embodiments, an interconnect protocol supplementation is provided in which all connected masters or slaves provide an invalid combination of data and EDC information in their output data memories as long as the protected information (address phase, data phase, control information) is not of importance for the interconnect protocol used. This enables the receiver of the information to discover errors in situations in which invalid information reaches it from inactive masters or slaves on account of connection errors.

Figure 5:
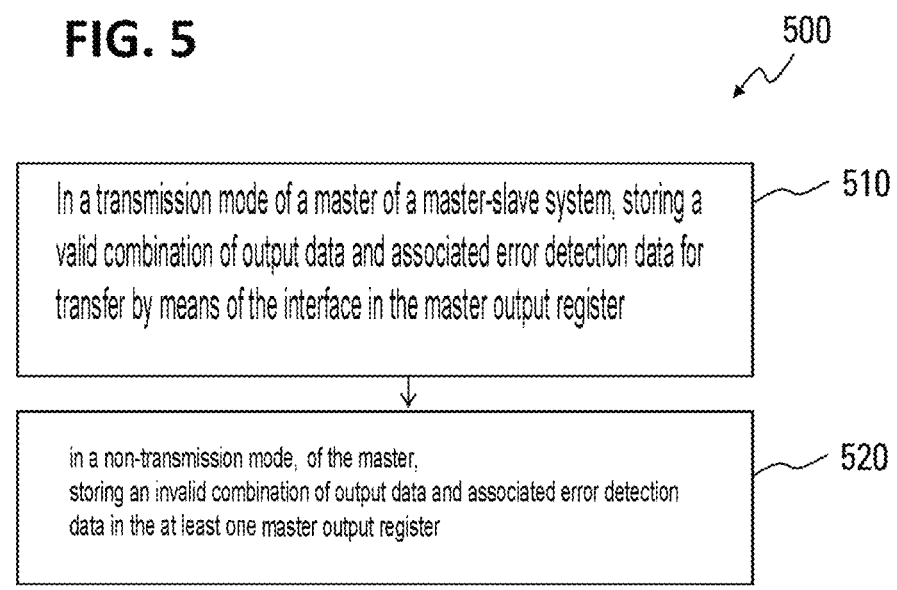
FIG. 5 shows a flow diagram of a method for operating a master-slave system in accordance with various exemplary embodiments.

FIG. 5 shows a flow diagram 500 of a method for operating a master-slave system comprising at least one master having at least one master output data memory, at least one slave and an interface connecting the at least one master to the at least one slave.

The method can comprise, in a transmission mode of the master, storing a valid combination of output data and associated error detection data for transfer by means of the interface in the master output data memory (510), and, in a non-transmission mode of the master, storing an invalid combination of output data and associated error detection data in the at least one master output data memory (520).

Figure 6:
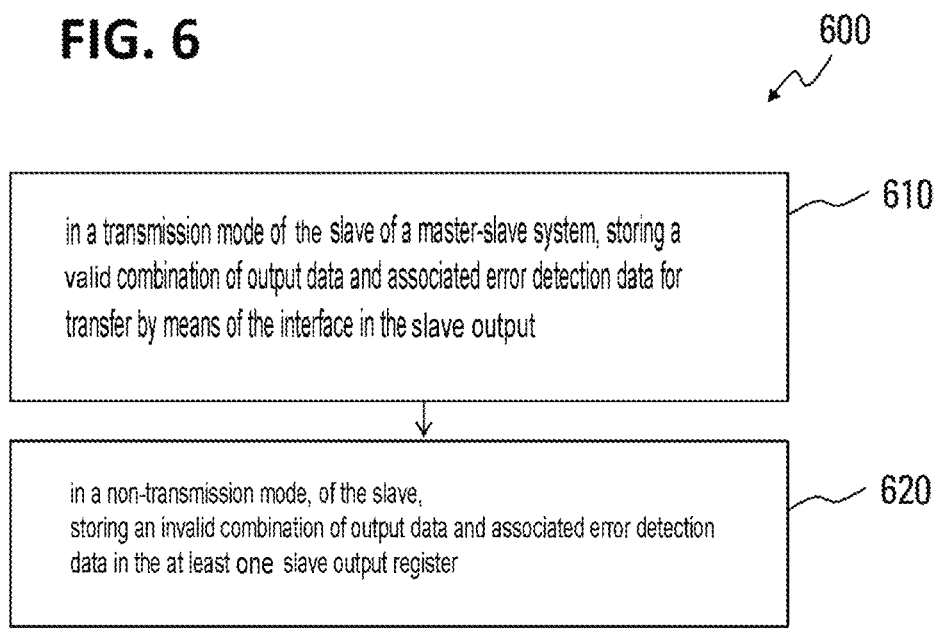
FIG. 6 shows a flow diagram of a method for operating a master-slave system in accordance with various exemplary embodiments.

FIG. 6 shows a flow diagram 600 of a method for operating a master-slave system comprising at least one slave having at least one slave output data memory, at least one master and an interface connecting the at least one master to the at least one slave.

The method can comprise, in a transmission mode of the slave, storing a valid combination of output data and associated error detection data for transfer by means of the interface in the slave output data memory (610), and, in a non-transmission mode of the slave, storing an invalid combination of output data and associated error detection data in the at least one slave output data memory (620).

Some exemplary embodiments are specified in summary below.

Exemplary embodiment 1 is a master of a master-slave communication system. The master-slave system comprises an interface connecting the at least one master to at least one slave. The at least one master is designed, in a transmission mode, to transfer a valid combination of output data and associated error detection data by means of the interface, and the at least one master is furthermore designed, in a non-transmission mode to output an invalid combination of output data and associated error detection data in the case of an erroneous output request, wherein the master optionally comprises a master output data memory and is designed to store therein, in a transmission mode the valid combination of output data and associated error detection data and, in a non-transmission mode, the invalid combination of output data and associated error detection data.

Exemplary embodiment 2 is a slave of a master-slave communication system. The master-slave communication system comprises an interface connecting the slave to at least one master. The at least one slave is designed, in a transmission mode, to transfer a valid combination of output data and associated error detection data by means of the interface, and the at least one slave is furthermore designed, in a non-transmission mode, to output an invalid combination of output data and associated error detection data in the case of an erroneous output request, wherein the slave optionally comprises a slave output data memory and is designed to store therein, in a transmission mode, the valid combination of output data and associated error detection data and, in a non-transmission mode, the invalid combination of output data and associated error detection data.

Exemplary embodiment 3 is a master-slave communication system comprising at least one master in accordance with exemplary embodiment 1, and at least one slave, wherein the at least one slave is designed, in a transmission mode, to transfer a valid combination of output data and associated error detection data by means of the interface, and wherein the at least one slave is furthermore designed to output in a non-transmission mode an invalid combination of output data and associated error detection data in the case of an erroneous output request, wherein the slave optionally comprises a slave output data memory and is designed to store therein, in a transmission mode, the valid combination of output data and associated error detection data and, in a non-transmission mode, the invalid combination of output data and associated error detection data.

Exemplary embodiment 4 is a master-slave communication system having a slave in accordance with exemplary embodiment 2 and at least one master, wherein the at least one master is designed, in a transmission mode in the master output data memory to transfer a valid combination of output data and associated error recognition data by means of the interface, and wherein the at least one master is furthermore designed, in a non-transmission mode, to output an invalid combination of output data and associated error detection data in the case of an erroneous output request, wherein the master optionally comprises a master output data memory and is designed to store therein, in a transmission mode, the valid combination of output data and associated error detection data and, in a non-transmission mode, the invalid combination of output data and associated error detection data.

Exemplary embodiment 5 is a master-slave communication system in accordance with either of exemplary embodiments 3 and 4, wherein the invalid combination of output data and associated error detection data is generated from the valid combination of output data and associated error detection data by means of changing at least one bit of the error detection data and/or at least one bit of the output data.

Exemplary embodiment 6 is a master-slave communication system in accordance with any of exemplary embodiments 3 to 5, wherein the invalid combination of output data and associated error detection data is generated from the valid combination of output data and associated error detection data by means of inverting at least one bit of the error detection data and/or at least one bit of the output data.

Exemplary embodiment 7 is a master-slave communication system in accordance with exemplary embodiment 6, wherein the invalid combination of output data and associated error detection data is generated from the valid combination of output data and associated error detection data by means of inverting all bits of the error detection data and maintaining all bits of the output data.

Exemplary embodiment 8 is a master-slave communication system in accordance with exemplary embodiment 6, wherein the invalid combination of output data and associated error detection data is generated from the valid combination of output data and associated error detection data by means of inverting all bits of the output data and maintaining all bits of the error detection data.

Exemplary embodiment 9 is a master-slave communication system in accordance with any of exemplary embodiments 3 to 8, wherein the at least one slave is furthermore designed, in a reception mode, to receive data and associated error detection data by means of the interface and to verify the data by means of the associated error detection data, wherein data received in the slave owing to an error are recognized as invalid by the at least one master in the non-transmission mode.

Exemplary embodiment 10 is a master-slave communication system in accordance with any of exemplary embodiments 3 to 9, wherein the at least one master is furthermore designed, in a reception mode, to receive data and associated error detection data by means of the interface and to verify the data by means of the associated error detection data, wherein data received in the master owing to an error are recognized as invalid by the at least one slave in the non-transmission mode.

Exemplary embodiment 11 is a master-slave communication system in accordance with any of exemplary embodiments 3 to 10, wherein the at least one master comprises a plurality of masters, wherein each of the plurality of masters optionally comprises at least one master output data memory.

Exemplary embodiment 12 is a master-slave communication system in accordance with any of exemplary embodiments 3 to 11, wherein the at least one slave comprises a plurality of slaves, wherein each of the plurality of slaves optionally comprises at least one slave output data memory.

Exemplary embodiment 13 is a master-slave communication system in accordance with any of exemplary embodiments 3 to 12, designed to carry out the data transfer between the master and slave in accordance with an interconnect protocol.

Exemplary embodiment 14 is an on-chip interconnect system comprising a master-slave communication system in accordance with any of exemplary embodiments 3 to 13, wherein the at least one master, the at least one slave and the interface are embodied as a common chip.

Exemplary embodiment 15 is a method for operating a master connected to at least one slave by means of an interface, wherein the method comprises, in a transmission mode of the master, transferring a valid combination of output data and associated error detection data by means of the interface in the master output data memory, and, in a non-transmission mode of the master, outputting an invalid combination of output data and associated error detection data in the case of an erroneous output request, wherein the master optionally comprises a master output data memory and is designed to store therein, in a transmission mode, the valid combination of output data and associated error detection data and, in a non-transmission mode, the invalid combination of output data and associated error detection data.

Exemplary embodiment 16 is a method for operating a slave connected to at least one master by means of an interface, wherein the method comprises, in a transmission mode of the slave, transferring a valid combination of output data and associated error detection data by means of the interface, and, in a non-transmission mode of the slave, outputting an invalid combination of output data and associated error detection data in the case of an erroneous output request, wherein the slave optionally comprises a slave output data memory and is designed to store therein, in a transmission mode, the valid combination of output data and associated error detection data and, in a non-transmission mode, the invalid combination of output data and associated error detection data.

Exemplary embodiment 17 is a method for operating a master-slave communication system, comprising operating a master in accordance with exemplary embodiment 15, and furthermore, in a transmission mode of the slave, transferring a valid combination of output data and associated error detection data by means of the interface, and, in a non-transmission mode of the slave, outputting an invalid combination of output data and associated error detection data in the case of an erroneous output request, wherein the slave optionally comprises a slave output data memory and is configured to store therein, in a transmission mode, the valid combination of output data and associated error detection data and, in a non-transmission mode, the invalid combination of output data and associated error detection data.

Exemplary embodiment 18 is a method for operating a master-slave communication system, comprising operating a slave in accordance with exemplary embodiment 16, and furthermore, in a transmission mode of the master, transferring a valid combination of output data and associated error detection data by means of the interface, and, in a non-transmission mode of the master, outputting an invalid combination of output data and associated error detection data in the case of an erroneous output request, wherein the master optionally comprises a master output data memory and is configured to store therein, in a transmission mode, the valid combination of output data and associated error detection data and, in a non-transmission mode, the invalid combination of output data and associated error detection data.

Exemplary embodiment 19 is a method in accordance with either of exemplary embodiments 17 and 18, wherein generating the invalid combination of output data and associated error detection data comprises changing at least one bit of the error detection data and/or at least one bit of the output data of the valid combination of error detection data and output data.

Exemplary embodiment 20 is a method in accordance with any of exemplary embodiments 17 to 19, wherein generating the invalid combination of output data and associated error detection data comprises inverting at least one bit of the error detection data and/or at least one bit of the output data of the valid combination of error detection data and output data.

Exemplary embodiment 21 is a method in accordance with exemplary embodiment 20, wherein generating the invalid combination of output data and associated error detection data comprises inverting all bits of the error detection data and maintaining all bits of the output data.

Exemplary embodiment 22 is a method in accordance with exemplary embodiment 20, wherein generating the invalid combination of output data and associated error detection data comprises inverting all bits of the output data and maintaining all bits of the error detection data.

Exemplary embodiment 23 is a method in accordance with any of exemplary embodiments 17 to 23, furthermore comprising, in a reception mode of the slave, receiving data and associated error detection data by means of the interface in the slave, and verifying the data by means of the associated error detection data, wherein data received in the slave owing to an error are recognized as invalid by the at least one master in the non-transmission mode.

Exemplary embodiment 24 is a method in accordance with any of exemplary embodiments 17 to 23, furthermore comprising, in a reception mode of the master, receiving data and associated error detection data by means of the interface in the master, and verifying the data by means of the associated error detection data, wherein data received in the master owing to an error are recognized as invalid by the at least one slave in the non-transmission mode.

Exemplary embodiment 25 is a method in accordance with any of exemplary embodiments 17 to 24, wherein the at least one master comprises a plurality of masters, wherein optionally each of the plurality of masters comprises at least one master output data memory.

Exemplary embodiment 26 is a method in accordance with any of exemplary embodiments 17 to 25, wherein the at least one slave comprises a plurality of slaves, wherein optionally each of the plurality of slaves comprises at least one slave output data memory.

Exemplary embodiment 27 is a method in accordance with any of exemplary embodiments 17 to 26, wherein the data transfer between the master and the slave is effected on the basis of an interconnect protocol.

Exemplary embodiment 28 is a method for operating an on-chip interconnect system in which the at least one master, the at least one slave and the interface are embodied on a common chip, wherein the method comprises a method for operating a master-slave communication system in accordance with any of exemplary embodiments 17 to 27.

Further advantageous embodiments of the device are evident from the description of the method, and vice versa.

What is claimed is:

1. A master of a master-slave communication system comprising:
   the master; and
   an interface configured to connect the master to at least one slave;
   wherein the master is designed, in a transmission mode to transfer a valid combination of output data and associated error detection data via the interface; and
   wherein the master is furthermore designed, in a non-transmission mode, to output an invalid combination of output data and associated error detection data in case of an erroneous output request;
   wherein the invalid combination of output data and the associated error detection data is generated from the valid combination of output data and associated error detection data via changing at least one bit of the output data and/or at least one bit of the associated error detection data.

2. A master-slave communication system, comprising:
   the master as claimed in claim 1; and
   at least one slave;
   wherein the at least one slave is designed, in a transmission mode to transfer a valid combination of output data and associated error detection data via the interface; and
   wherein the at least one slave is furthermore designed, in a non-transmission mode, to output an invalid combination of output data and associated error detection data in case of an erroneous output request.

3. The master-slave communication system of claim 2, wherein the invalid combination of output data and associated error detection data is generated from the valid combination of output data and the associated error detection data via inverting at least one bit of the error detection data and/or at least one bit of the output data.

4. The master-slave communication system of claim 3, wherein the invalid combination of output data and associated error detection data is generated from the valid combination of output data and associated error detection data via inverting all bits of the error detection data and maintaining all bits of the output data.

5. The master-slave communication system of claim 3, wherein the invalid combination of output data and associated error detection data is generated from the valid combination of output data and associated error detection data via inverting all bits of the output data and maintaining all bits of the error detection data.

6. The master-slave communication system of claim 2, wherein the at least one slave is furthermore designed, in a reception mode, to receive data and associated error detection data via the interface and to verify the data via the associated error detection data, wherein data received in the slave owing to an error are recognized as invalid by the master in the non-transmission mode.

7. The master-slave communication system of claim 2, wherein the master is furthermore designed, in a reception mode, to receive data and associated error detection data via the interface and to verify the data via the associated error detection data, wherein data received in the master owing to an error are recognized as invalid by the at least one slave in the non-transmission mode.

8. A master-slave communication system, comprising:
a master-slave communication system of claim 2,
wherein the master, the at least one slave and the interface are embodied on a common chip.

9. A slave of a master-slave communication system comprising:
the slave; and
an interface configured to connect at least one master to the slave;
wherein the slave is designed, in a transmission mode to transfer a valid combination of output data and associated error detection data via the interface; and
wherein the slave is furthermore designed, in a non-transmission mode, to output an invalid combination of output data and associated error detection data in case of an erroneous output request;
wherein the invalid combination of output data and associated error detection data is generated from the valid combination of output data and associated error detection data via changing at least one bit of the output data and/or at least one bit of the associated error detection data.

10. A master-slave communication system, comprising:
the slave as claimed in claim 9; and
at least one master;
wherein the at least one master is designed, in a transmission mode to transfer a valid combination of output data and associated error detection data via the interface; and
wherein the at least one master is furthermore designed, in a non-transmission mode, to output an invalid combination of output data and associated error detection data in case of an erroneous output request.

11. A method for operating a master connected to at least one slave via an interface, the method comprising:
in a transmission mode of the master, transferring a valid combination of output data and associated error detection data via the interface; and
in a non-transmission mode of the master, outputting an invalid combination of output data and associated error detection data in case of an erroneous output request;
wherein the invalid combination of output data and associated error detection data is generated from the valid combination of output data and associated error detection data via changing at least one bit of the output data and/or at least one bit of the associated error detection data.

12. A method for operating a master-slave communication system, comprising:
operating the master of claim 11,
in a transmission mode of the at least one slave, transferring a valid combination of output data and associated error detection data
in a non-transmission mode of the at least one slave, outputting an invalid combination of output data and associated error detection data in case of an erroneous output request.

13. A method for operating a slave connected to at least one master via an interface, the method comprising:
in a transmission mode of the slave, transferring a valid combination of output data and associated error detection data via the interface; and
in a non-transmission mode of the slave, outputting an invalid combination of output data and associated error detection data in case of an erroneous output request;
wherein the invalid combination of output data and associated error detection data is generated from the valid combination of output data and associated error detection data via changing at least one bit of the output data and/or at least one bit of the associated error detection data.

14. A method for operating a master-slave communication system, comprising:
operating the slave of claim 13;
in a transmission mode of the at least one master, transferring a valid combination of output data and associated error detection data via the interface; and
in a non-transmission mode of the at least one master, outputting an invalid combination of output data and associated error detection data in case of an erroneous output request.

15. The method of claim 14,
wherein the invalid combination of output data and associated error detection data is generated by changing at least one bit of the error detection data and/or at least one bit of the output data of the valid combination of output data and associated error detection data.

16. The method of claim 14,
wherein the invalid combination of output data and associated error detection data is generated by inverting at least one bit of the error detection data and/or at least one bit of the output data of the valid combination of output data and associated error detection data.

17. The method as claimed in claim 4,
wherein the invalid combination of output data and associated error detection data is generated by inverting all bits of the error detection data and maintaining all bits of the output data.

18. The method as claimed in claim 4,
wherein the invalid combination of output data and associated error detection data comprises inverting all bits of the output data and maintaining all bits of the error detection data.

19. The method of claim 18, furthermore comprising:
in a reception mode of the slave, receiving data and associated error detection data via the interface in the slave; and
verifying the data via the associated error detection data, wherein data received in the slave owing to an error are recognized as invalid by the at least one master in the non-transmission mode.

20. The method of claim 19, furthermore comprising:
in a reception mode of the master, receiving data and associated error detection data via the interface in the master; and verifying the data via the associated error detection data, wherein data received in the master owing to an error are recognized as invalid by the slave in the non-transmission mode.

21. The method as claimed in any of claim 20, wherein the data transfer between the master and the slave is effected based on an interconnect protocol.

* * * * *